(12) United States Patent
Kim et al.

(10) Patent No.: US 9,363,532 B2
(45) Date of Patent: Jun. 7, 2016

(54) INTRA PREDICTION METHOD AND APPARATUS, AND IMAGE ENCODING/DECODING METHOD AND APPARATUS USING SAME

(71) Applicant: SK TELECOM CO., LTD., Seoul (KR)

(72) Inventors: Hayoon Kim, Seongnam-si (KR); Yunglyul Lee, Seoul (KR); Joohee Moon, Seoul (KR); Haekwang Kim, Seoul (KR); Byeungwoo Jeon, Seongnam-si (KR); Hyemin Jun, Seoul (KR); Daeyeon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 434 days.

(21) Appl. No.: 13/947,403

(22) Filed: Jul. 22, 2013

(65) Prior Publication Data

US 2013/0301717 A1 Nov. 14, 2013

Related U.S. Application Data

(63) Continuation of application No. 13/001,611, filed as application No. PCT/KR2009/003237 on Jun. 17, 2009, now Pat. No. 8,976,862.

(30) Foreign Application Priority Data

Jun. 24, 2008 (KR) .................. 10-2008-0059322

(51) Int. Cl.
*H04N 19/167* (2014.01)
*H04N 19/593* (2014.01)
(Continued)

(52) U.S. Cl.
CPC ............ *H04N 19/593* (2014.11); *H04N 19/11* (2014.11); *H04N 19/124* (2014.11); *H04N 19/136* (2014.11); *H04N 19/167* (2014.11);

(Continued)

(58) Field of Classification Search
CPC ................................ H04N 19/00066
USPC ........................ 375/240.01–240.29
See application file for complete search history.

(56) References Cited

U.S. PATENT DOCUMENTS

2012/0140821 A1* 6/2012 Drugeon ............ H04N 19/105
375/240.12

FOREIGN PATENT DOCUMENTS

| KR | 1020050090451 | 9/2005 |
|---|---|---|
| KR | 1020070072327 | 7/2007 |
| KR | 1020070076357 | 7/2007 |

OTHER PUBLICATIONS

International Search Report mailed Feb. 16, 2010 for PCT/KR2009/003237, citing the above references.

*Primary Examiner* — Andy Rao
(74) *Attorney, Agent, or Firm* — Hauptman Ham, LLP

(57) ABSTRACT

The present disclosure relates to an intra prediction method and apparatus and an image encoding/decoding method and apparatus using the same. The disclosure provides the intra prediction apparatus that predicts the pixel values of respective pixels in a current block by weight-averaging the pixel values of one or more adjacent pixels in neighboring blocks to the current block according to the distances between each pixel in the current block and the adjacent pixel(s). According to the disclosure, the current block to be encoded can be predicted more accurately so that the encoding efficiency is improved by reducing the difference between the original block and the predicted block, and thereby video compression efficiency can be improved.

18 Claims, 10 Drawing Sheets

(51) Int. Cl.
*H04N 19/50* (2014.01)
*H04N 19/11* (2014.01)
*H04N 19/136* (2014.01)
*H04N 19/182* (2014.01)
*H04N 19/176* (2014.01)
*H04N 19/124* (2014.01)

(52) U.S. Cl.
CPC ........... *H04N19/176* (2014.11); *H04N 19/182* (2014.11); *H04N 19/50* (2014.11)

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

*FIG.10*

INTRA PREDICTION METHOD AND APPARATUS, AND IMAGE ENCODING/DECODING METHOD AND APPARATUS USING SAME

CROSS-REFERENCE TO RELATED APPLICATION

The present application is a continuation of U.S. patent application Ser. No. 13/001,611, filed on Dec. 27, 2010, which is the National Phase application of International Application No. PCT/KR2009/003237, filed on Jun. 17, 2009, which designates the United States and was published in Korean. Further, this application claims the priority of Korean Patent Application No. 10-2008-0059322, filed on Jun. 24, 2008 in the KIPO (Korean Intellectual Property Office). This application, in its entirety, is incorporated herein by reference the entire disclosure of which is incorporated herein by reference.

TECHNICAL FIELD

The present disclosure relates to a method and apparatus for determining an intra prediction mode, and a method and apparatus for encoding/decoding video using the same. More particularly, the present disclosure relates to an intra prediction method and apparatus for carrying out prediction encoding and decoding of a current block of an image from its neighboring block in a way to minimize the difference between the original current block and a predicted current block, and to an image encoding/decoding method and apparatus using the same.

BACKGROUND ART

The statements in this section merely provide background information related to the present disclosure and may not constitute prior art.

Moving Picture Experts Group (MPEG) and Video Coding Experts Group (VCEG) have developed an improved and excellent video compression technology over prior MPEG-4 Part 2 and H.263 standards. The new standard is called H.264/AVC (Advanced Video Coding) and was released simultaneously as MPEG-4 Part 10 AVC and ITU-T Recommendation H.264. H.264/AVC (shortened as H.264 hereinafter) differently uses a spatial predictive coding method relative to existing video coding-related international standards of MPEG-1, MPEG-2, MPEG-4 Part2 Visual, etc.

Conventional methods use "intra prediction" for coefficients transformed in Discrete Cosine Transform Domain (or DCT Transform Domain) to seek higher encoding efficiency resulting in degradation of the subjective video quality at low band transmission bit rates. In contrast, H.264 adopts the method of encoding based on a spatial intra prediction in a spatial domain rather than in a transform domain.

Encoders using an encoding method based on the conventional spatial intra predictions take information on the previously encoded and reconstructed block to predict current block information therefrom, encode information on just the difference of the predicted block from the original block to be encoded, and transmit the encoded information to a decoder. At this time, the encoder may transmit parameters needed for prediction of the block information to the decoder, or the encoder and decoder may be synchronized so that they share the needed parameters for the decoder to predict the block information. On the other hand, the desired block to be currently decoded is generated and reconstructed by first predicting its neighboring blocks that are completely decoded and reconstructed and then obtaining the sum of difference information or residual data transmitted from the encoder and the predicted neighboring block information. Then, also, if the parameters needed for the prediction are transmitted from the encoder, the decoder uses the same to predict the neighboring block information.

There are different intra predictions such as an intra_4×4 prediction, intra_16×16 prediction, and intra_8×8 prediction among others, where the respective intra predictions include a plurality of prediction modes.

FIG. 1 is a exemplary diagram showing conventional nine 4×4 intra prediction modes.

Referring to FIG. 1, the intra_4×4 prediction has nine prediction modes which include a vertical mode, horizontal mode, direct current (DC) mode, diagonal down-left mode, diagonal down-right mode, vertical-right mode, horizontal-down mode, vertical-left mode and horizontal-up mode.

FIG. 2 is an exemplary diagram showing conventional four 16×16 intra prediction modes.

Referring to FIG. 2, the intra_16×16 prediction has four prediction modes which include a vertical mode, horizontal mode, DC mode and plane mode. The intra_8×8 prediction also has four modes similar to the intra_16×16 prediction.

In an intra prediction that uses the DC mode as the prediction mode (or in a 'DC mode prediction' in short), the result is an average value obtained in a unit of block. Here, the average value means an average of 8 pixels (for the case of intra_4×4 prediction) from the current block's left side 4 pixels plus the current block's upper side 4 pixels or an average of 32 pixels (for the case of intra_16×16 prediction) from the current block's left side 16 pixels plus the current block's upper side 16 pixels. Therefore, in performing the DC mode prediction, the neighboring blocks to the current block are averaged for predicting all of the 4×4 pixels or the 16×16 pixels.

Hence, regardless of the type of prediction which is intra_4×4 prediction or intra_16×16 prediction or another, the prediction values or predictors are the same with respect to the current block's 16 pixels for the case of intra_4×4 prediction or 256 pixels for the case of intra_16×16 prediction. This lowers the accuracy of predicting the current block to cause a decrease of coding efficiency or compression efficiency.

In addition, the dropped prediction accuracy will increase the differential value between the original block and the predicted block whereby the above DC mode prediction produces a greater amount of the difference information and a decline in the video compression efficiency disadvantageously.

DISCLOSURE

Technical Problem

Therefore, the present disclosure has been made in view of the above mentioned problems to principally improve the video compression efficiency by closing the gap between the original block and the predicted block in performing the intra predictions for predicting the current video block.

Technical Solution

An aspect of the present disclosure provides an intra prediction apparatus including a weighted pixel calculator for calculating a plurality of weighted pixel values by applying weights decided by a position of the current pixel in the current block to pixels in the neighboring blocks; and a pixel predictor for deriving a predicted pixel value of the current pixel using the weighted pixel values, wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

Another aspect of the present disclosure provides an intra prediction method including calculating a plurality of weighted pixel values by applying weights decided by a position of the current pixel in the current block to pixels in the neighboring blocks; and deriving a predicted pixel value of the current pixel using the weighted pixel values, wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

Yet another aspect of the present disclosure provides a video encoding apparatus including an intra predictor for predicting a current block by calculating a plurality of weighted pixel values by applying weights decided by a position of the current pixel in the current block to pixels in the neighboring blocks, and deriving a predicted pixel value of the current pixel using the weighted pixel values; a subtractor for generating a residual signal by calculating a difference between an original pixel value in the current block and the predicted pixel value; a transformer for transforming the residual signal into a frequency domain; a quantizer for quantizing the transformed residual signal; and an encoder for encoding the quantized residual signal into a bitstream, wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

Advantageous Effects

As described above, the present disclosure is able to more accurately predict the current block to be encoded, to thereby close the gap between the original pixel and the predicted pixel toward a heightened coding efficiency and improved video compression efficiency.

DESCRIPTION OF DRAWINGS

FIG. 10 is an exemplary diagram a process of predicting the current block by using a weighted value by pixel distances according to an aspect.

MODE FOR INVENTION

Figure 1:
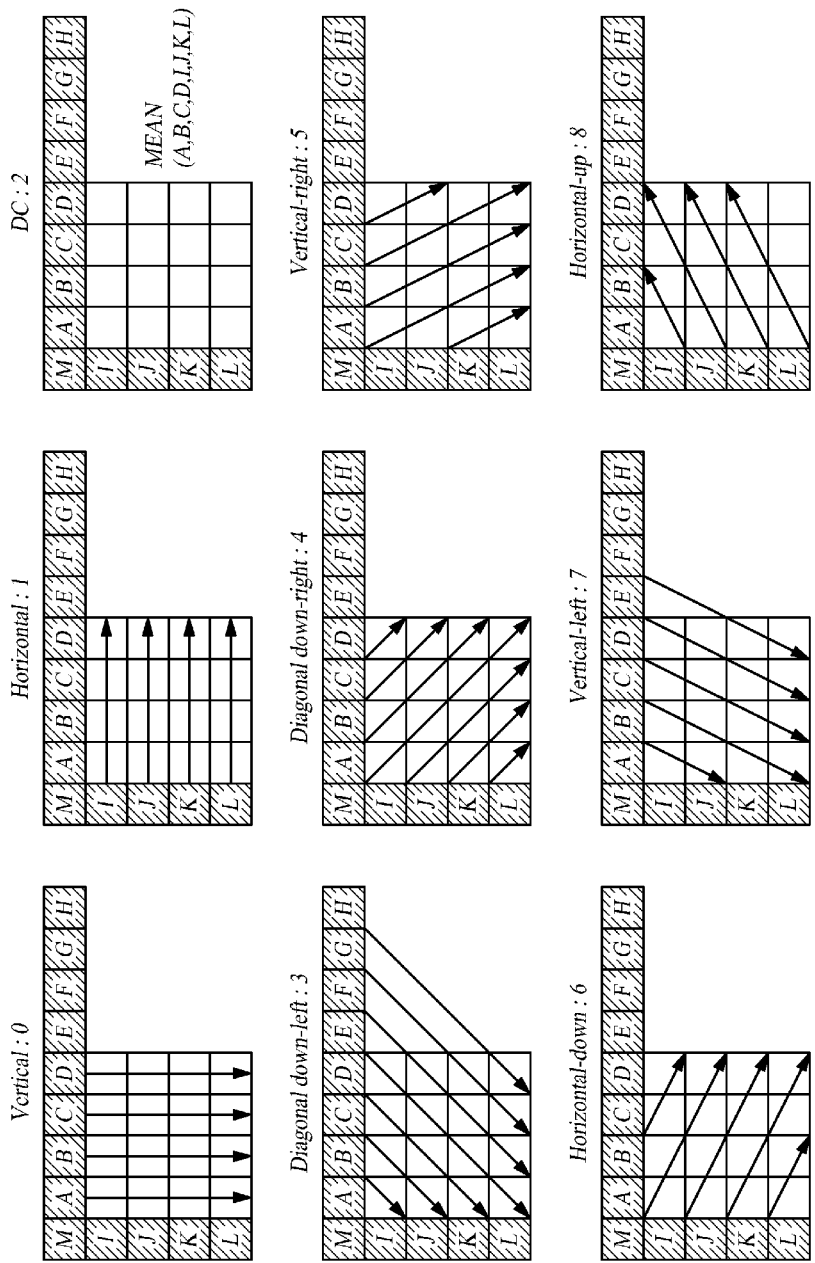
FIG. 1 is an exemplary diagram showing conventional nine 4×4 intra prediction modes.
Figure 2:
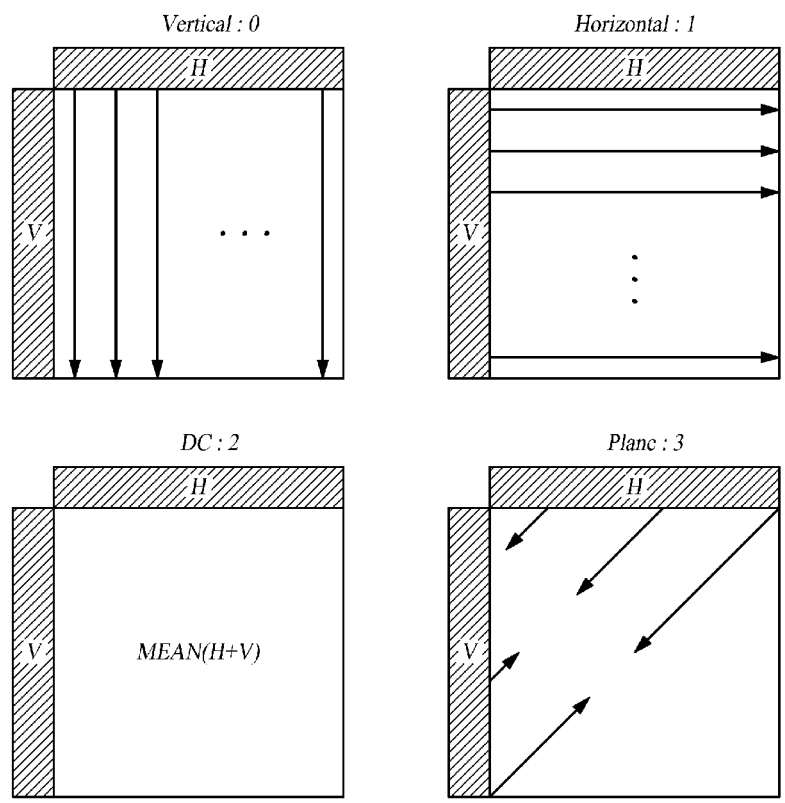
FIG. 2 is an exemplary diagram showing conventional four 16×16 intra prediction modes.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Figure 3:
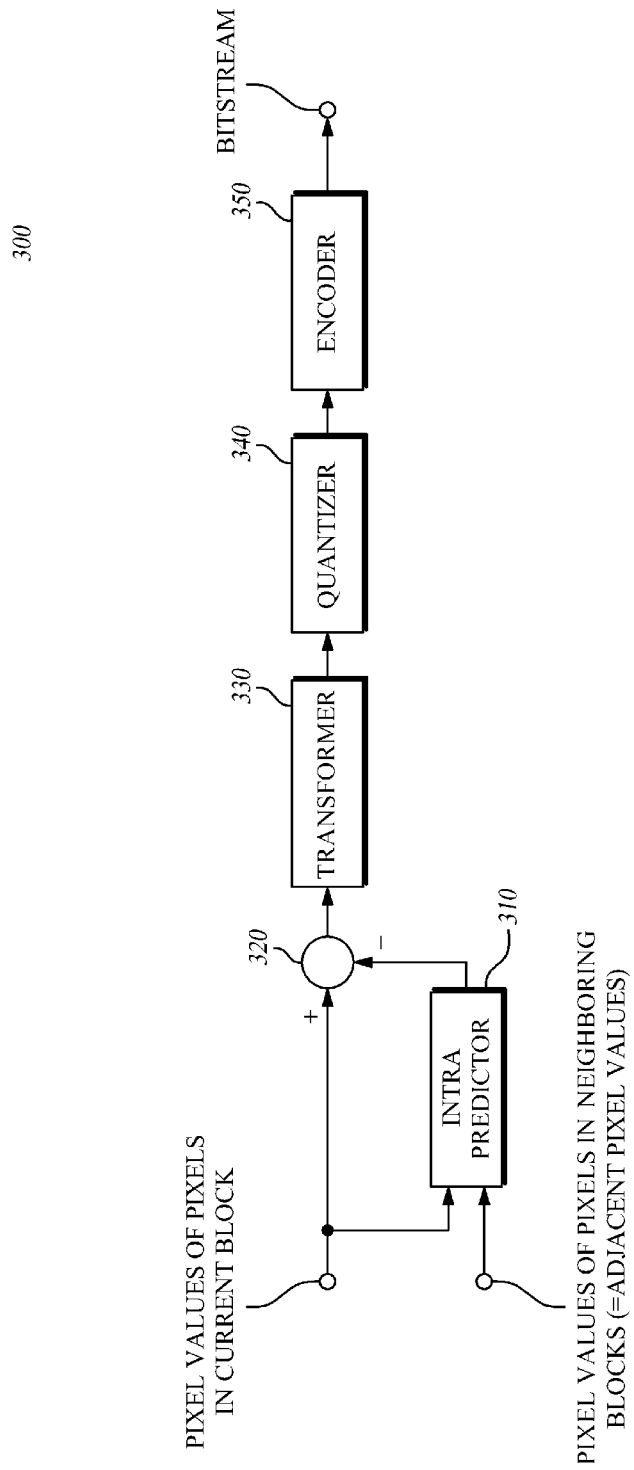
FIG. 3 is a block diagram of an electronic configuration of a video encoding apparatus according to an aspect.

FIG. 3 is a block diagram of an electronic configuration of a video encoding apparatus 300 according to an aspect of the present disclosure.

Video encoding apparatus 300 of this aspect is adapted to predict a video current block using one or more of its neighboring blocks in order to encode the video, and may include an intra predictor 310, a subtractor 320, a transformer 330, a quantizer 340, and an encoder 350.

Video encoding apparatus 300 may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Intra predictor 310 predicts in a video the current block by using its neighboring block, and specifically by calculating predicted pixel values of respective pixels in the current block with a weight value applied to one of more pixel values of one or more of the neighboring blocks. Here, the neighboring block may mean one or more blocks which are compressed prior to and positioned adjacent to the current block, and specifically one or more of left side blocks of the current block and upper side blocks of the current block.

In addition, intra predictor 310 may exclusively have a DC mode intra prediction perform the intra prediction process on the current block with the weight value applied, wherein the DC mode is to predict an average of the pixel values of the one or more adjacent pixels in the neighboring block to the current block for the pixel values of the current block. In addition, the weight value may be variably applied depending on the distances between respective pixels in the current block and the respective one or more adjacent pixels in the one or more neighboring blocks.

When using the DC intra prediction mode which had typically predicted the respective current block pixels by averaging the pixel values of the one or more relatively adjacent pixels in the neighboring block to the current block, intra predictor 310 does not simply jump from averaging the adjacent pixels' values to predicting the averaged value as the pixel values of the entire current bock pixels but does calculations of weighted pixel values by variably setting and applying weights to the pixel values of the adjacent pixels depending on the distances between the respective current block pixels and their adjacent pixels and then averages these weighted pixels values so as to make a prediction for the pixel values of the entire current block pixels. The "adjacent pixels" herein may refer to the pixels within the blocks that are neighboring the current block although they may be within the neighboring blocks and not close to the current block. Intra predictor 310 will be described below in more detail referring to FIG. 4.

Subtractor 320 generates a residual signal from the difference between the original pixel value of each pixel in the current block and a predicted pixel value of each pixel in the current block.

Transformer 330 transforms the residual signal generated from subtractor 320 into a frequency domain. Here, transformer 330 may perform the frequency domain transform through various transforming techniques of video signals from on a temporal axis onto a frequency axis such as discrete cosine transform (called DCT) or wavelet transform.

Quantizer 340 performs a quantization with respect to the transformed frequency domain residual signal from transformer 330. Encoder 350 encodes the quantized residual signal from quantizer 340 into a bitstream.

Although various other coding techniques are unrestricted for use in the disclosure, entropy coding may be adopted herein.

Figure 4:
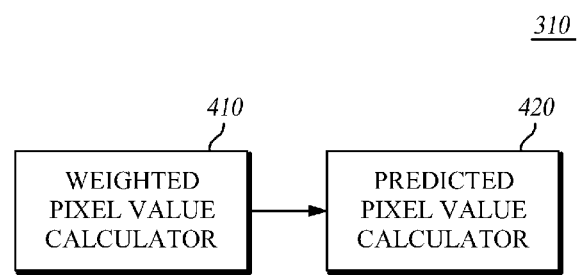
FIG. 4 is a block diagram of an electronic configuration of an intra prediction apparatus according to an aspect.

FIG. 4 is a block diagram of an electronic configuration of an intra prediction apparatus according to an aspect.

The intra prediction apparatus may be implemented by intra predictor 310 when it is applied to video encoding apparatus 300 described with reference to FIG. 3. Hereinafter, the intra prediction apparatus will be conveniently and simply called intra predictor 310.

Intra predictor 310 in this aspect predicts in a video the current block by using one or more of its neighboring blocks, and specifically it carries out predictions with respect to pixel values of respective pixels in a current block by performing weighted averaging of pixel values of one or more adjacent pixels in the one or more neighboring blocks depending on the distances between the respective pixels in the current block and the respective one or more adjacent pixels.

Intra predictor 310 may comprise a weighted pixel value calculator 410 and a predicted pixel value calculator 420, and it is adapted to predict the current block by calculating predicted pixel values of the respective pixels in the current block through applying a weight value to one or more pixel values of the one or more neighboring blocks.

Weighted pixel value calculator 410 applies the weight value to the pixel value(s) of each of the adjacent pixel(s) in the neighboring block(s) to the current block to be encoded so as to calculate the weighted pixel values of the adjacent pixel(s).

Here, weighted pixel value calculator 410 may differently perform the weighting operation depending on calculations of the distances between the positions of the respective pixels in the current block and those of their respectively adjacent pixels, and may calculate the weighted pixel values of the adjacent pixels according to the variable weight applications depending on the pixel-to-pixel distances. Additionally, in the weighting operation on the adjacent pixel values, weighted pixel value calculator 410 may apply the weight value in inverse proportion to the calculated distances.

Specifically, weighted pixel value calculator 410 may apply a larger weight value to the neighboring block pixel value in response to a closer distance between the current block pixel and its neighboring block pixel that implies the pixels' strong resemblance, while calculator 410 may apply a smaller weight value to the neighboring block pixel value in response to a farther distance between the current block pixel and its neighboring block pixel that implies the pixels' weak resemblance. In this way of weighting in inverse proportion to the distances between the current block pixels and their neighboring block pixels, it becomes possible to further reduce the disparity between the current block and the prediction block with the pixel-to-pixel similarities considered in the intra prediction that performs in the DC prediction mode (hereinafter called 'DC mode prediction' in short).

Predicted pixel value calculator 420 calculates the predicted pixel values of the respective pixels in the current block using the weighted pixel values calculated for the adjacent pixel(s) by weighted pixel value calculator 410.

Further, predicted pixel value calculator 420 may calculate the predicted pixel values of the respective pixels in the current block by averaging the weighted pixel values of the adjacent pixel(s) with respect to the respective pixels in the current block.

Figure 5:
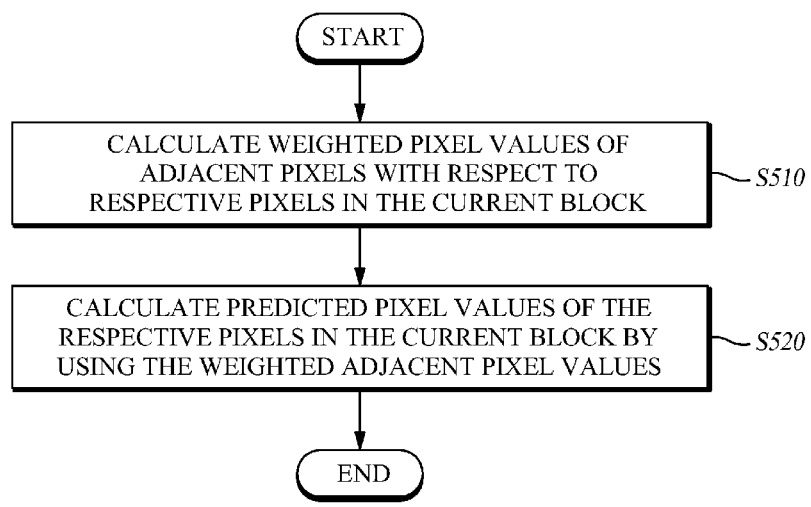
FIG. 5 is a flow diagram of an intra prediction method according to an aspect.

FIG. 5 is a flow diagram of an intra prediction method according to an aspect.

In the video encoding operation, video encoding apparatus 300 improves the encoding efficiency by reducing the encoded data amount through encoding the difference between the original pixel value of the current block to be encoded and the predicted pixel value of the current block that is predicted, the pixel difference being a residual signal.

For this purpose, intra predictor 310 predicts the video current block by using its neighboring block(s) as described above, and calculates weighted pixel values of adjacent pixels with respect to respective pixels in the current block that is the subject to encode in step S510. In other words, intra predictor 310 calculates the weighted pixel values of the one or more adjacent pixels by applying a weight value to the respective adjacent pixel(s) included in the neighboring block(s) (and being adjacent to the current block in particular).

In addition, when the weighted pixel values of the adjacent pixels are calculated, intra predictor 310 calculates predicted pixel values of the respective pixels in the current block by using those weighted adjacent pixel values in step S520. Here, intra predictor 310 may calculate the current block's respective predicted pixel values by averaging the one or more adjacent blocks' weighted pixel values.

Intra predictor 310, in step S510 of calculating the weighted pixel values of the adjacent pixels with respect to the respective current block pixels, may count the distances between the positions of the respective current block pixels and the adjacent pixels to differently perform the weighting operation.

Figure 6:
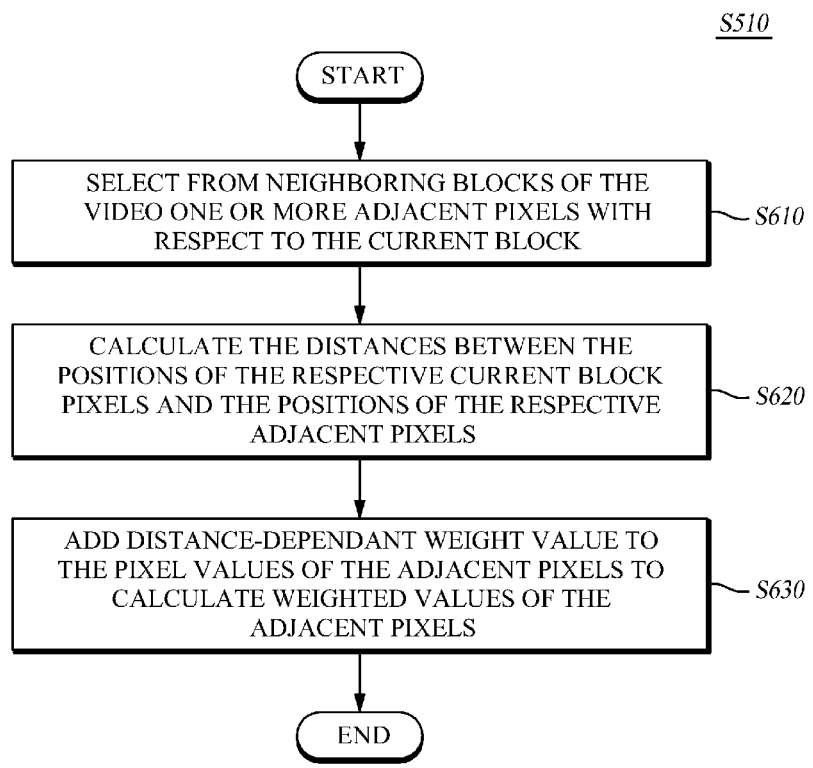
FIG. 6 is a flow diagram of a process of calculating weighted pixel values of adjacent pixels to respective pixels in a current block according to an aspect.

FIG. 6 is a flow diagram of a process of calculating weighted pixel values of adjacent pixels to respective pixels in a current block according to an aspect.

Upon deciding the subject block to be encoded in a video that is the current block, intra predictor 310 selects from its neighboring blocks of the video one or more adjacent pixels with respect to the current block in step S610. Here, the selected adjacent pixels may be one or more of all the adjacent pixels in a left side block of the current block, or one or more of all the adjacent pixels in an upper side block of the current block, or the entire adjacent pixels of the left and upper side blocks, although they are not so restricted but include all of the pixels in the current block's surrounding blocks (with right side and lower side blocks).

With the adjacent pixel(s) selected, intra predictor 310 calculates the distances between the positions of the respective current block pixels and the positions of the respective adjacent pixels in step S620. Upon calculating such pixel-to-pixel distances, intra predictor 310 differently set the weight value depending on the calculated distances in step S620 for applying the set weight value to the pixel values of the adjacent pixel(s) to calculate weighted values of the adjacent pixel(s) in step S630.

Specifically, when the neighboring block adjacent pixels are selected as in step S610, intra predictor 310 chooses a particular one of the entire current block pixels to calculate its distances to the respective selected adjacent pixels. In differently setting the weight value depending on the respective adjacent pixels' calculated distances from the particular pixel and variably weighting the respective adjacent pixel values, intra predictor 310 responds to a longer pixel distance for applying a smaller weight value and to a shorter pixel distance for applying a larger weight value, thereby counting the similarity between the particular pixel and adjacent pixels. In this way, the calculation of weighted adjacent pixel values is performed with the variable weighting according to the different pixel distances. Intra predictor 310 repeatedly performs the calculation of the weighted adjacent pixel value with respect to the particular current block pixel for all of the pixels.

Upon completing the calculation of weighted pixel values through differently weighting the adjacent pixel values by the distances of the adjacent pixels to the entire current block pixels, intra predictor 310 calculates a predicted pixel value for a particular pixel of the current block by averaging the weighted adjacent pixel values for the particular pixel which is repeatedly performed for the entire pixels of the current block to calculate predicted pixel values for the entire current block pixels.

Figure 7:
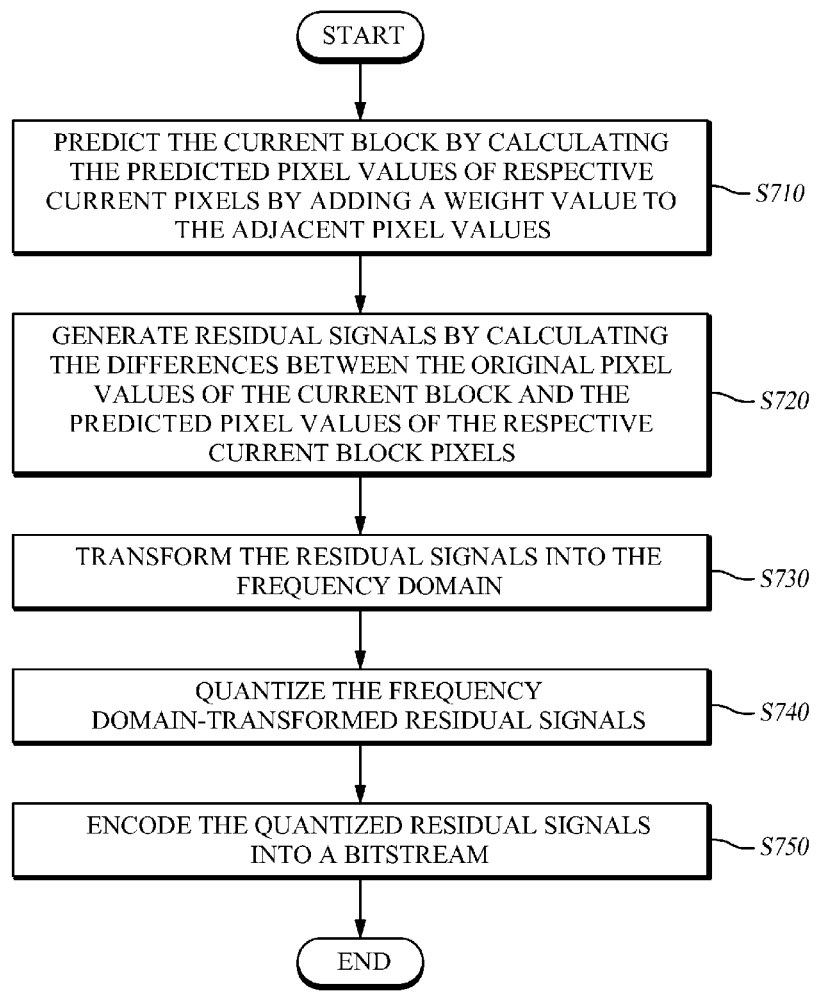
FIG. 7 is a flow diagram of a video encoding method according to an aspect.

FIG. 7 is a flow diagram of a video encoding method according to an aspect.

Video encoding apparatus 300 according to an aspect described with reference to FIG. 3 uses the intra predicting apparatus of intra predictor 310 in the intra prediction method described with reference to FIGS. 4-6 in predicting the video current block to encode the video.

Specifically, video encoding apparatus 300 predicts the current block by calculating the predicted pixel values of respective current pixels by applying a weight value to the adjacent pixel value(s) in step S710, generates residual signals by calculating the differences between the original pixel values of the respective current block pixels and the predicted pixel values of the respective current block pixels in step S720, transforms the residual signals into the frequency domain transform through various transforming techniques such as DCT or wavelet transform in step S730, and quantizes the frequency domain-transformed residual signals in step S740, and encodes the quantized residual signals into a bitstream in step S750.

As described above, the encoded bitstream of video by the video encoding apparatus 300 may then be transmitted in real time or non-real-time to video decoding apparatuses for decoding the same into the reconstructions and reproductions via a wired/wireless communication network including the Internet, a short range wireless communication network, a wireless LAN network, WiBro (Wireless Broadband) also known as WiMax network, and mobile communication network or a communication interface such as cable or USB (universal serial bus).

Figure 8:
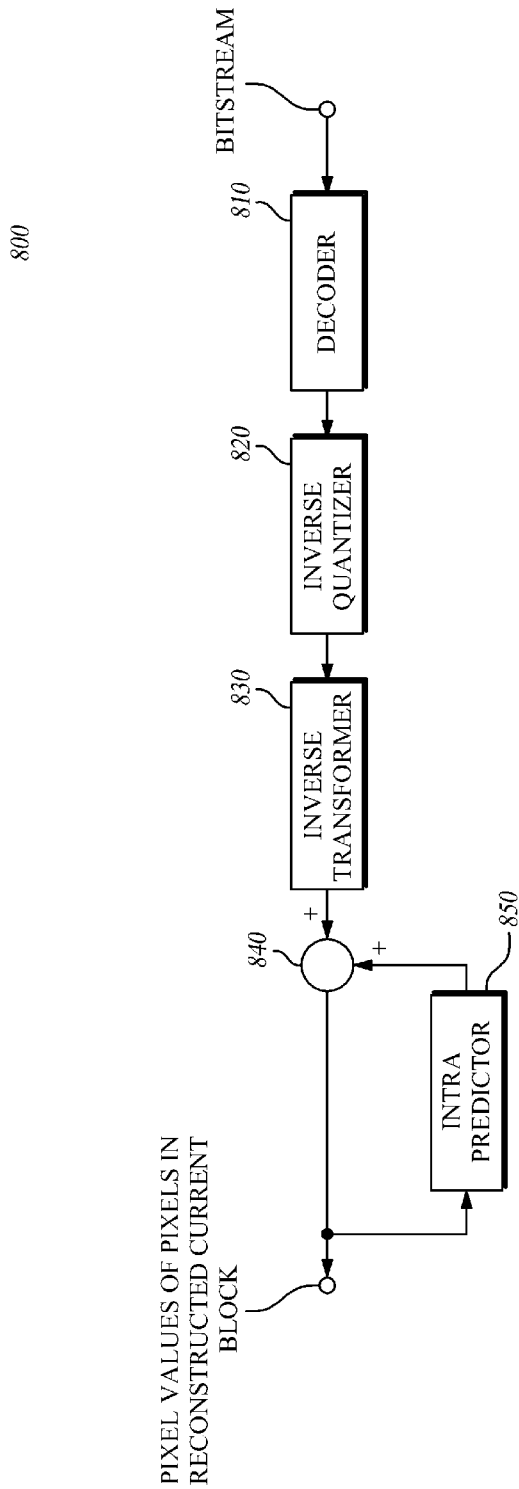
FIG. 8 is a block diagram of an electronic configuration of a video decoding apparatus according to an aspect.

FIG. 8 is a block diagram of an electronic configuration of a video decoding apparatus 800 according to an aspect.

Video decoding apparatus 800 uses adjacent block(s) to a video current block to predict the current block and decodes the video, and it includes a decoder 810, inverse quantizer 820, inverse transformer 830, adder 840, and intra predictor 850.

Similar to video encoding apparatus 300 described with reference to FIG. 3, video decoding apparatus 800 may be a personal computer or PC, notebook or laptop computer, personal digital assistant or PDA, portable multimedia player or PMP, PlayStation Portable or PSP, or mobile communication terminal, smart phone or such devices, and represents a variety of apparatuses equipped with, for example, a communication system such as a modem for carrying out communications between various devices or wired/wireless communication networks, a memory for storing various programs for encoding videos and related data, and a microprocessor for executing the programs to effect operations and controls.

Decoder 810 decodes the bitstream and extracts a residual signal. In other words, decoder 810 decodes the encoded video of the bitstream to extract the residual signal, which contains pixel information of the current block in the video.

Inverse quantizer 820 inversely quantizes or performs de-quantization with respect to the extracted residual signal from the bitstream. Inverse transformer 830 inversely transforms the de-quantized residual signal from inverse quantizer 820 into a time-domain domain.

Adder 840 adds predicted pixel values of respective current block pixels from intra predictor 850 to the inversely transformed residual signal from inverse quantizer 820 to reconstruct the actual pixel value of the current block.

To predict the current block, intra predictor 850 calculates the predicted pixel values of the current block by weighting pixel values of one or more adjacent pixels in one or more blocks which are among many previously decoded and reconstructed video blocks and neighboring the current block.

The value for weighting may vary depending on the distances between the respective current block pixel(s) and the neighboring block adjacent pixel(s). In addition, intra predictor 850 may operate only with the DC mode prediction for the weighting to calculate the predicted pixels values of the respective current block pixels.

Besides, intra predictor 850 of video decoding apparatus 800 may work the same as or similar to intra predictor 310 of video encoding apparatus 300 in predicting the current block by using the neighboring blocks. Therefore, more detailed descriptions are omitted to avoid repeated description.

Figure 9:
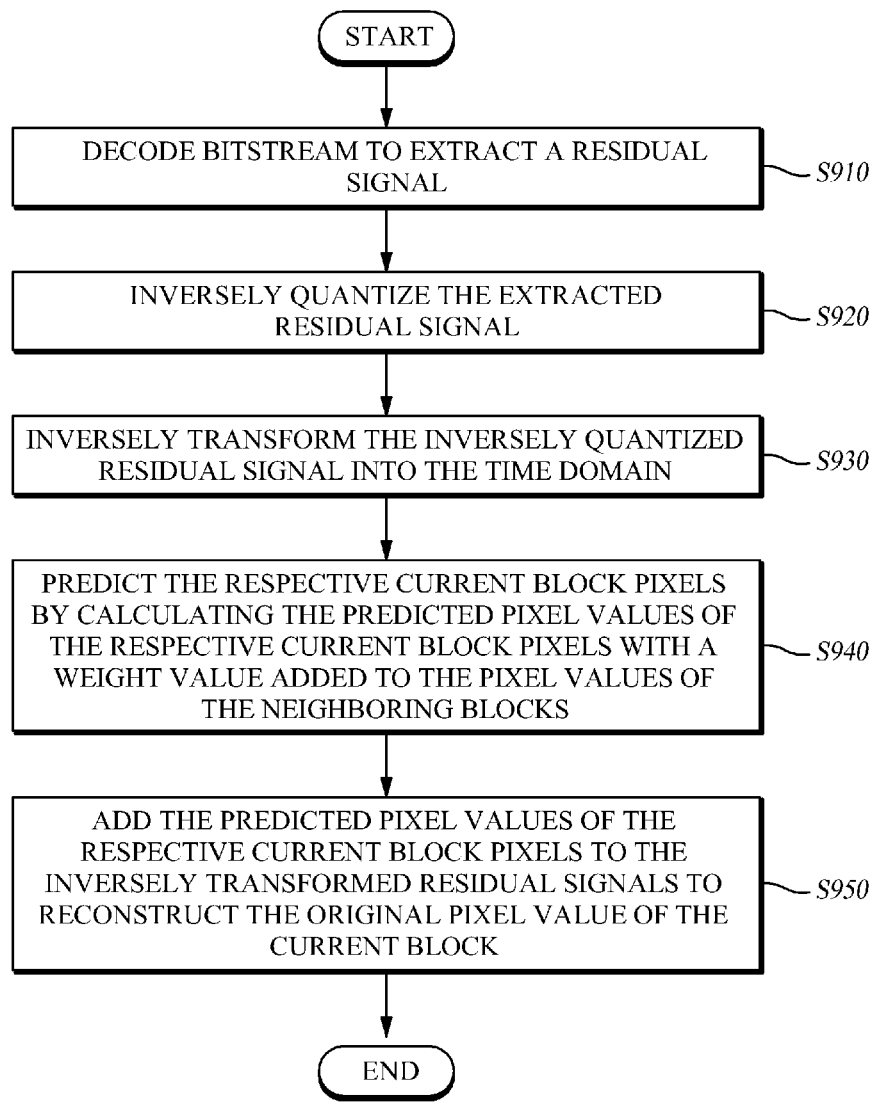
FIG. 9 is a flow diagram of a video decoding method according to an aspect.

FIG. 9 is a flow diagram of a video decoding method according to an aspect.

Video decoding apparatus 800 having received and stored the bitstream for the video through the wired/wireless communication network seeks to reproduce the video in accordance with a user selected or other program algorithm in execution by predicting the video current block using its neighboring block(s) and decoding the video and then reproducing the same.

To this end, video decoding apparatus 800 decodes the bitstream to extract a residual signal which indicates information on the pixel values of the video current block in step S910. Upon extracting the residual signal, video decoding apparatus 800 inversely quantizes the extracted residual signal in step S920, inversely transforms the inversely quantized residual signal into the time domain in step S930, predicts the current block by calculating the predicted pixel values of the respective current block pixels with a weight value applied to the pixel value(s) of the adjacent pixel(s) in the neighboring block(s) with respect to the current block that the time-domain-intra-transformed residual signal represents in step S940, and in step S950 adds the predicted pixel values of the respective predicted current block pixels of step S940 to the residual signals of the inversely transformed current block of step S930 in order to reconstruct the original pixel value of the current block.

Figure 10:
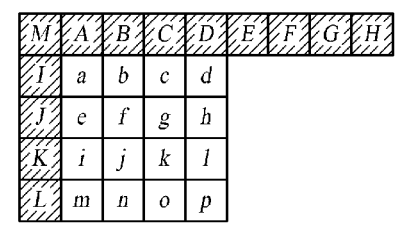

FIG. 10 is an exemplary diagram a process of predicting the current block by using a variable weighted value by pixel distances according to an aspect.

The intra prediction is typically performed using "multiple intra prediction modes" including a DC mode in which the averaged value of previously encoded neighboring block pixels (possibly the left side block pixels and upper side block pixels in particular) is used to predict the pixel values of the entire current block pixels and in turn the current block.

In FIG. 10, there are shown pixels used in the intra_4×4 prediction of H.264, one of the video compression technical standard. The sixteen small letters 'a' to 'p' represent the pixels in the current block to be encoded, and the sixteen capital letters A to M represent the previously compressed neighboring block pixels (i.e., adjacent pixels).

Applying the nine intra prediction modes for the typical intra_4×4 mode prediction described referring to FIG. 1 to performing the intra prediction with respect to the current block as shown in FIG. 10, nine directions of predictions are made by using the pixel values of the previously compressed neighboring blocks A to M, and the optimum prediction mode is determined by using rate-distortion optimization or RDO among the nine intra prediction modes.

When applying the DC mode numbered 2 as shown in FIG. 1 to predicting the pixel values of the current block pixels as shown in FIG. 10, the conventional prediction methods arrange the sixteen pixels a through p to be predicted as a single value. For example, at the first row and the first column pixel 'a' has a predicted pixel value calculated by equation 1 as with the remaining pixels 'b' through 'p'. Thus, the current block pixels are predicted to be commonly valued regardless of their positions.

$$a=(A+B+C+D+I+J+K+L)/8 \qquad \text{Equation 1}$$

As described, because such a typical method for predicting pixel values of the current block using the DC mode does not differentially value the relative distances of the current block pixels to the adjacent pixels (A through L) but predicts as the common pixel value, it has been impossible to predict accurate pixel values by the pixel positions within the current block.

Actually, though the original pixels in the current block to be encoded may have the common value, they may also have different pixel values that the closer the current block pixels are to the adjacent pixels, the stronger the similarity gets to the adjacent pixels, while the farther the current block pixels are to the adjacent pixels, the weaker the similarity gets to the adjacent pixels. Specifically, the pixel values of the current block pixels are more probable to be similar to the pixel values of the adjacent pixels as these pixel-to-pixel distances get closer. However, the conventional current block pixel value prediction method using the DC mode ignores such a positional relationship between the the current block pixels and the adjacent pixels resulting in the entire pixels being predicted as commonly assigned the averaged value of the pixels values of the adjacent pixels.

On the contrary, an aspect of the present disclosure counts the positional relativity between the current block pixels and the adjacent pixels in predicting the pixel values of the current block pixels.

For example, when a prediction is performed on the pixels values of the pixels used the intra_4×4 prediction, the pixel values are calculated by applying a weight value to the sixteen a to p pixels' left side block's adjacent pixels (I, J, K, L) and their upper side blocks' adjacent pixels (A, B, C, D).

Here, the weighting value may be determined in inverse proportion to calculations of the distances between the current block pixels to be encoded and the neighboring blocks' adjacent pixels. In other words, in predicting the pixel values of the respective current block pixels by using the pixel values of their neighboring block adjacent pixels (for example, the pixel values of the left side blocks' adjacent pixels and upper side blocks' adjacent pixels), the present disclosure determines that a shorter distance between the current block pixels and the neighboring blocks' adjacent pixels indicates a stronger similarity between the current pixels and the adjacent pixels and heavily weights the pixel values of the neighboring blocks' adjacent pixels, whereas a longer distance between the current block pixels and the neighboring blocks' adjacent pixels is deemed representing a weaker similarity between the current pixels and the adjacent pixels and a smaller weight value is applied to the pixel values of the neighboring blocks' adjacent pixels.

In an aspect of the disclosure as described, the pixel values of the respective current block pixels are predicted by performing weighted averaging of pixels values of the one or more adjacent pixels in the neighboring blocks to the current block depending on the distances between the respective current block pixel(s) and the respective adjacent pixel(s). Equation 2 is to apply such a weighted averaging according to the pixel distance to predict the pixel values.

$$x=(f1 \times P1+f2 \times P2+\ldots+fn-1 \times Pn-1+fn \times Pn)/N \qquad \text{Equation 2}$$

Here, x represents the respective pixels in the current block (pixels a to p in FIG. 10), P1 through Pn are the neighboring blocks' adjacent pixels respectively (pixels A to L in FIGS. 10), and f1, f2, ... fn-1, fn are respectively the weight values depending on the distances between the respective current block pixels x and the neighboring blocks' adjacent pixels P1 through Pn. In addition, N equals to f1+f2+ ... +fn-1+fn.

Predicting the respective current block pixels 'a' to 'p' shown in FIG. 10 by using Equation 2 may be expressed by Equation 3. However, to easily describe about predicting the pixel values of the respective pixels, the neighboring blocks are restricted to include the current block's left side blocks and upper side blocks, the adjacent pixels in the neighboring blocks are also restricted to the adjacent pixels that belong to the corresponding row and column as those of the current block and such adjacent pixels are used to predict the respective current block pixels. Though, the present disclosure is not restricted to such a limitation but may use partial or entire adjacent pixels in the current block's neighboring blocks to predict the current block.

$$a=(A+I)/2$$

$$b=(2B+1)/3$$

$$c=(3C+I)/4$$

$$d=(4D+1)/5$$

$$e=(A+2J)/3$$

$$f=(2B+2J)/4$$

$$g=(3C+2J)/5$$

$$h=(4D+2J)/6$$

$$i=(A+3K)/4$$

$$j=(2B+3K)/5$$

$$k=(3C+3K)/6$$

$$l=(4D+3K)/7$$

$$m=(A+4L)/5$$

$$n=(2B+4L)/6$$

$$o=(3C+4L)/7$$

$$p=(4D+4L)/8 \quad \text{Equation 3}$$

Here, reviewing the pixel value of pixel 'a', it can be determined by the upper side block's adjacent pixel A and the left side block's adjacent pixel I, and pixel 'a' is equally located to the pixels A and I with a space of a single pixel (basic distance). Therefore, pixel 'a' in the basic distance is calculated by applying a basic weight value '1' to the pixels A and I, and assuming the entire pixels are distanced one another by '1', 'a' equals to (1×A+1×I)/(1+1)=(A+I)/2.

In addition, reviewing the pixel value of pixel 'g', it can be determined by the upper side block's adjacent pixel C and the left side block's adjacent pixel J, and pixel 'g' is distanced by two pixels (basic distance×2) from pixel C and three pixels (basic distance×3) from pixel J. Therefore, the weight value for calculating the pixel value of pixel 'g' is assigned '2' for pixel C and '3' for pixel J, and assuming the entire pixels are distanced one another by '1', 'g' equals to (3×C+2×J)/(3+2)=(3C+2J)/5.

As described, in performing the DC mode prediction by using the pixel values of the neighboring block's adjacent pixels with the weight value considered according to the distances between the current block pixels and the neighboring blocks' adjacent pixels, no more the predicted pixel values of the current block are determined en bloc as has been typical but rather they can be predicted into different predicted pixel values by the positions of the respective current block pixels.

In the example aspect described with reference to FIG. 10, the respective single pixels from the current block's left side block and upper side block are used to calculate the predicted pixel value of the current block. However, the present disclosure is not necessarily restricted to this example but may use a part or the entirety of the sixteen pixels a to p in the current block's left side block and upper side block to obtain the predicted value of a single pixel in the current block, and additionally use current block's other partial or entire surrounding blocks' pixel value(s) partially or entirely to obtain the predicted value of the single pixel in the current block.

This prediction of the current block by using the pixel values of the adjacent pixels with the variable weight value incorporated depending on the distances between the current block's pixels and the neighboring blocks' adjacent pixels is not only performed in video encoding apparatus 300 but equally performed in video decoding apparatus 800 by intra predictors 310 and 850.

As described, when video encoding apparatus 300 and video decoding apparatus 800 perform the DC mode predictions and upon determining the current block went through the intra prediction in the DC mode, either the intra_4×4 prediction or the intra_16×16 prediction counts the distance-based weight value in predicting the pixel value of the current block to obtain the optimal predicted pixel value though finely approximating the predicted current block to the original current block, and thereby reducing the differential value between the original current block and the predicted one which keeps up the intra prediction performance while improving the video compression efficiency and reducing the amount of data to be transmitted.

Although the above description is presented with video encoding apparatus 300 and video decoding apparatus 800 implemented as independent devices, they may be implemented in a single unit. The components of video encoding apparatus 300 and video decoding apparatus 800 of encoder 350, decoder 810, quantizer 340, inverse quantizer 820, transformer 330, inverse transformer 830, subtractor 320, adder 840, and intra predictors 310 and 850 may be independent hardware components implemented respectively to include memories for storing programs and microprocessors for executing the programs to realize their functions, although they may be implemented as program modules for carrying out the respective functions within the hardware of video encoding apparatus 300 and video decoding apparatus 800.

In addition, if video encoding apparatus 300 and video decoding apparatus 800 are implemented in a single unit, the counter functioning component pairs of encoder 350 and decoder 810, quantizer 340 and inverse quantizer 820, transformer 330 and inverse transformer 830, subtractor 320 and adder 840, and intra predictors 310 and 850 may be implemented in singular program modules, respectively.

Although exemplary aspects of the disclosure have been described for illustrative purposes, those skilled in the art will appreciate that various modifications, additions and substitutions are possible, without departing from the essential characteristics of the disclosure. Therefore, the aspects disclosed in the present disclosure have been described not for limiting the technical idea of the disclosure, but for explaining the disclosure. Accordingly, the scope of the disclosure should be interpreted by the appended claims, which by themselves and their equivalents are the claim scope of the disclosure.

INDUSTRIAL APPLICABILITY

As described above, the present disclosure is applicable to a method and apparatus for determining an intra prediction mode, and a method and apparatus for encoding/decoding video using the same for predicting a video current block from its neighboring blocks toward its encoding and reconstruction in a way to minimize the difference between the original current block and the predicted current block and thereby providing more accurate prediction of the current block to be encoded and reducing the error of the predicted block to improve the coding efficiency and thus the compression efficiency.

The invention claimed is:

1. An intra prediction apparatus for predicting a current pixel of a current block from neighboring blocks, comprising:
    a weighted pixel calculator for calculating a plurality of weighted pixel values by applying weights decided by a position of the current pixel in the current block to pixels in the neighboring blocks; and
    a pixel predictor for deriving a predicted pixel value of the current pixel using the weighted pixel values,
    wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

2. The intra prediction apparatus of claim 1, wherein the first pixel in the upper side block is neighboring the current block and the second pixel in the left side block is neighboring the current block
wherein the first pixel is selected to be vertically at the same position with the current pixel or the second adjacent pixel in the left neighboring block is selected to be horizontally at the same position with the current pixel.

3. The intra prediction apparatus of claim 1, wherein the first weight is decided by the distance between the current pixel and the first pixel in the upper side block, and the second weight is decided by the distance between the current pixel and the second pixel in the left side block.

4. The intra prediction apparatus of claim 1, wherein the weights are decided by the distance between the current pixel and the pixels in the neighboring blocks.

5. The intra prediction apparatus of claim 1, wherein the predicted pixel value equals to a sum of the weighted pixel values divided by a sum of the weights.

6. An intra prediction method for predicting a current pixel of a current block from neighboring blocks, comprising:
calculating a plurality of weighted pixel values by applying weights decided by a position of the current pixel in the current block to pixels in the neighboring blocks; and
deriving a predicted pixel value of the current pixel using the weighted pixel values,
wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

7. The method of claim 6, wherein the first pixel in the upper side block is neighboring the current block and the second pixel in the left side block is neighboring the current block
wherein the first pixel is selected to be vertically at the same position with the current pixel or the second adjacent pixel in the left neighboring block is selected to be horizontally at the same position with the current pixel.

8. The method of claim 6, wherein the first weight is decided by the distance between the current pixel and the first pixel in the upper side block, and the second weight is decided by the distance between the current pixel and the second pixel in the left side block.

9. The method of claim 6, wherein the weights are decided by the distance between the current pixel and the pixels in the neighboring blocks.

10. The method of claim 6, wherein the predicted pixel value equals to a sum of the weighted pixel values divided by a sum of the weights.

11. A video encoding apparatus comprising:
an intra predictor for predicting a current block by
calculating a plurality of weighted pixel values by applying weights decided by a position of the current pixel in the current block to pixels in the neighboring blocks, and
deriving a predicted pixel value of the current pixel using the weighted pixel values;
a subtractor for generating a residual signal by calculating a difference between an original pixel value in the current block and the predicted pixel value;
a transformer for transforming the residual signal into a frequency domain;
a quantizer for quantizing the transformed residual signal; and
an encoder for encoding the quantized residual signal into a bitstream,
wherein the weighted pixel values comprise a first weighted pixel value and a second weighted pixel value, the first weighted pixel value is calculated by applying a first weight of the weights to a first pixel in an upper side block, and the second weighted pixel value is calculated by applying a second weight of the weights to a second pixel in a left side block.

12. The video encoding apparatus of claim 11, wherein the first pixel in the upper side block is neighboring the current block and the second pixel in the left side block is neighboring the current block
wherein the first pixel is selected to be vertically at the same position with the current pixel or the second adjacent pixel in the left neighboring block is selected to be horizontally at the same position with the current pixel.

13. The video encoding apparatus of claim 11, wherein the first weight is decided by the distance between the current pixel and the first pixel in the upper side block, and the second weight is decided by the distance between the current pixel and the second pixel in the left side block.

14. The video encoding apparatus of claim 11, wherein the weights are decided by the distance between the current pixel and the pixels in the neighboring blocks.

15. The video encoding apparatus of claim 11, wherein the predicted pixel value equals to a sum of the weighted pixel values divided by a sum of the weights.

16. The intra prediction apparatus of claim 1, wherein the weighted pixel values further comprise one or more third weighted pixel values calculated by applying third weights of the weights to one or more third pixels in the neighboring blocks.

17. The method of claim 6, wherein the weighted pixel values further comprise one or more third weighted pixel values calculated by applying third weights of the weights to one or more third pixels in the neighboring blocks.

18. The video encoding apparatus of claim 11, wherein the weighted pixel values further comprise one or more third weighted pixel values calculated by applying third weights of the weights to one or more third pixels in the neighboring blocks.

* * * * *